No. 872,817. PATENTED DEC. 3, 1907.
F. J. HIPP.
FISH HOOK.
APPLICATION FILED JUNE 25, 1906.

WITNESSES
INVENTOR
FRANK J. HIPP
BY
HIS ATTORNEYS.

UNITED STATES PATENT OFFICE.

FRANK J. HIPP, OF NEW BRIGHTON, MINNESOTA.

FISH-HOOK.

No. 872,817.     Specification of Letters Patent.     Patented Dec. 3, 1907.

Application filed June 25, 1906. Serial No. 323,281.

*To all whom it may concern:*

Be it known that I, FRANK J. HIPP, of New Brighton, Ramsey county, Minnesota, have invented certain new and useful Improvements in Fish-Hooks, of which the following is a specification.

The object of my invention is to provide a hook of simple construction and one which can be easily and quickly made weedless, or used if preferred as an ordinary hook.

The invention consists generally in various constructions and combinations, all as hereinafter described and particularly pointed out in the claims.

Figure 1:
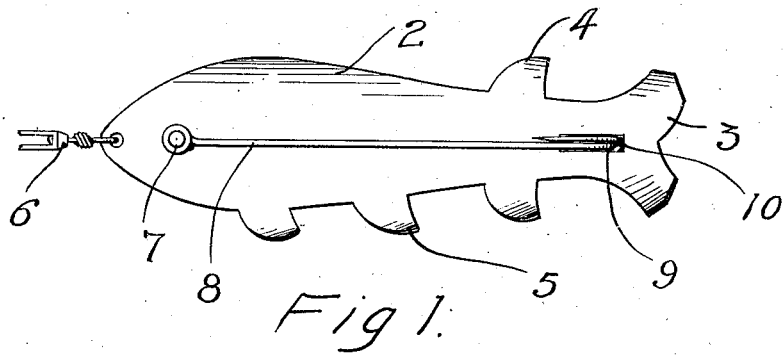
Figure 2:
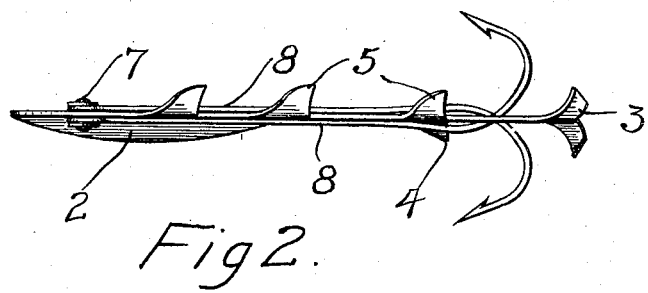
Figure 3:
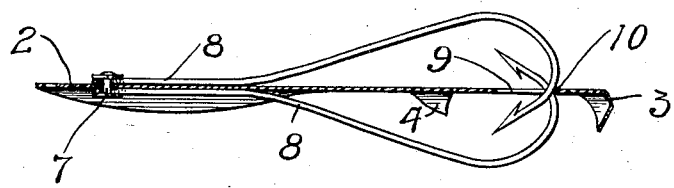

In the accompanying drawings, forming part of this specification; Figure 1 is a side view of a fish hook embodying my invention. Fig. 2 is bottom view of the same. Fig. 3 is a sectional view lengthwise of the hook, showing the barbs adjusted in their weedless position.

In the drawing, 2 represents the body of the device made in the shape of a minnow and having a tail 3 and back fin 4, and belly fins 5 formed to represent the fins of a fish and laterally turned at the ends to cause a whirling or rotary movement to be imparted to the device when it is drawn through the water in the act of trolling. An attachment 6 for a line is provided at the forward end or nose of the body portion and a rivet 7 is provided near said nose and has flattened ends to represent as nearly as possible the eyes of a fish. The rivet passes through and secures the forward ends of hook shanks 8 which extend back along each side of the body 2 and have their barbed ends projecting through a slot 9 formed in the part 2 near the tail. The shanks of the hooks cross one another in the slot so that the barb of a hook will be on the opposite side of the body 2 from the shank of that hook. The slot 9 is made of sufficient length so that the rear end 10 will engage the curved portion of the shanks near the barbs and when the hooks are separated as indicated in Fig. 3 and the barbs pressed inwardly toward one another, the rounded portions of the shanks will engage the end 10 and hold the barbs in that position, and the middle portions of the shanks will project outwardly on each side and serve as guards to prevent weeds, sticks or any other obstructions in the water from catching on the hooks. As soon, however, as the device is seized by a fish, a slight pressure will cause the barbs to fly apart and the hooks to return to their normal position, when a pull on the line will securely hook the fish.

In clear water, the device may be used as usual in trolling.

I claim as my invention:

1. An artificial bait having a body portion formed to resemble a fish and provided with an opening extending therethrough, and fish hooks having their shanks secured to said body portion on opposite sides thereof, the barbed ends of said hooks projecting through the opening in said body portion on each side, and the wall of said opening engaging the curved portions of said shanks near their barbed ends when the hooks are separated, and temporarily holding said barbs in an inoperative position with the shank of each hook protecting and forming a weed guard for the point of the other hook.

2. An artificial bait comprising a body portion formed to resemble a fish and having a slot near its tail, fish hooks secured near the forward end of said body portion and having their barbed ends projecting through said slot and the rear end of said slot engaging the curved portions of said shanks when the hooks are separated and temporarily holding said barbs in an inoperative position, substantially as described.

In witness whereof, I have hereunto set my hand this 21st day of June 1906.

FRANK J. HIPP.

Witnesses:
    RICHARD PAUL,
    J. H. BALDWIN.